May 13, 1958 J. G. HALPIN 2,834,558
PORTABLE RE-ROLL, INSPECTION, MEASURING AND CUTTING UNIT FOR RUGS
Filed April 21, 1955 3 Sheets-Sheet 1
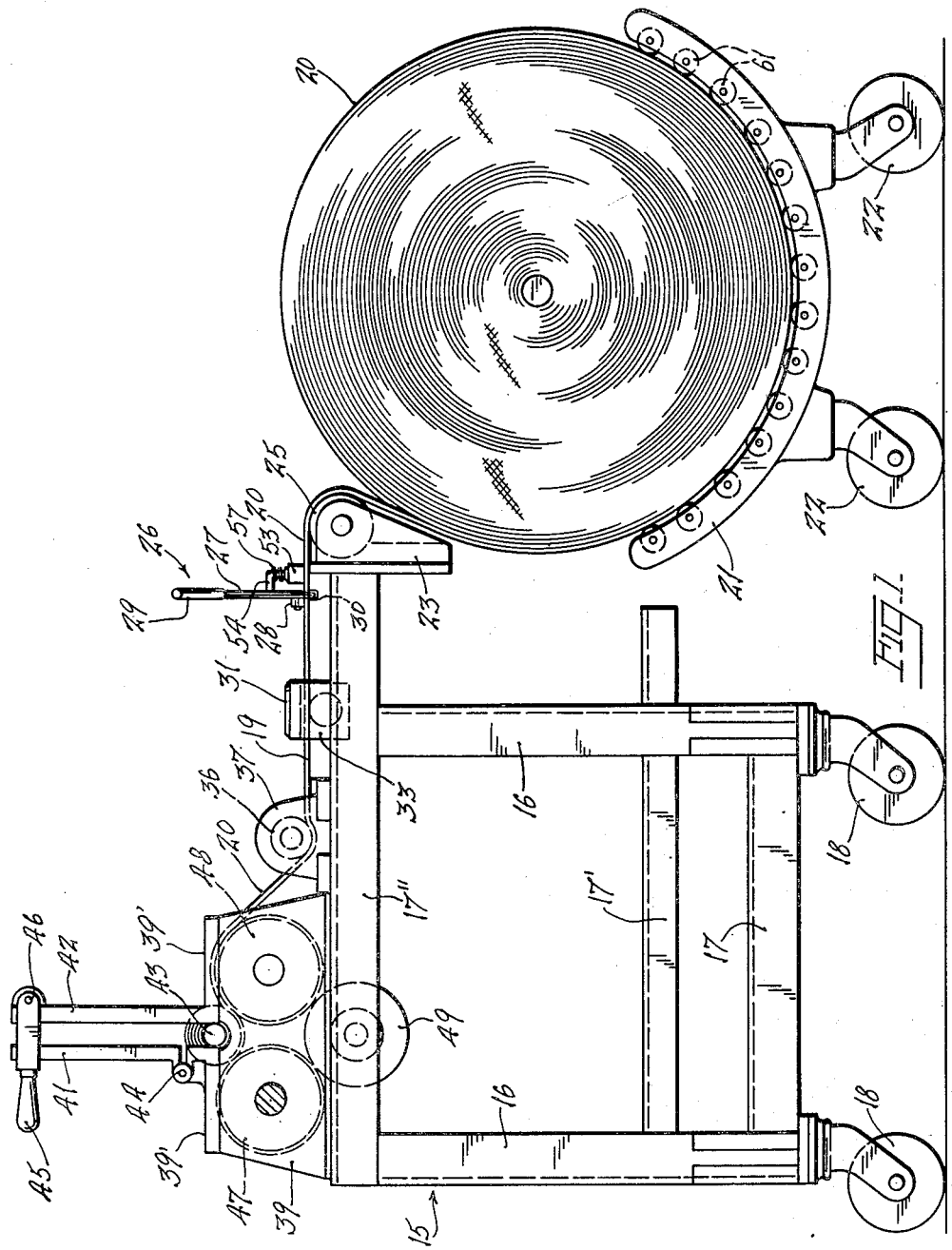
INVENTOR.
JOHN G. HALPIN
BY
ATTORNEY

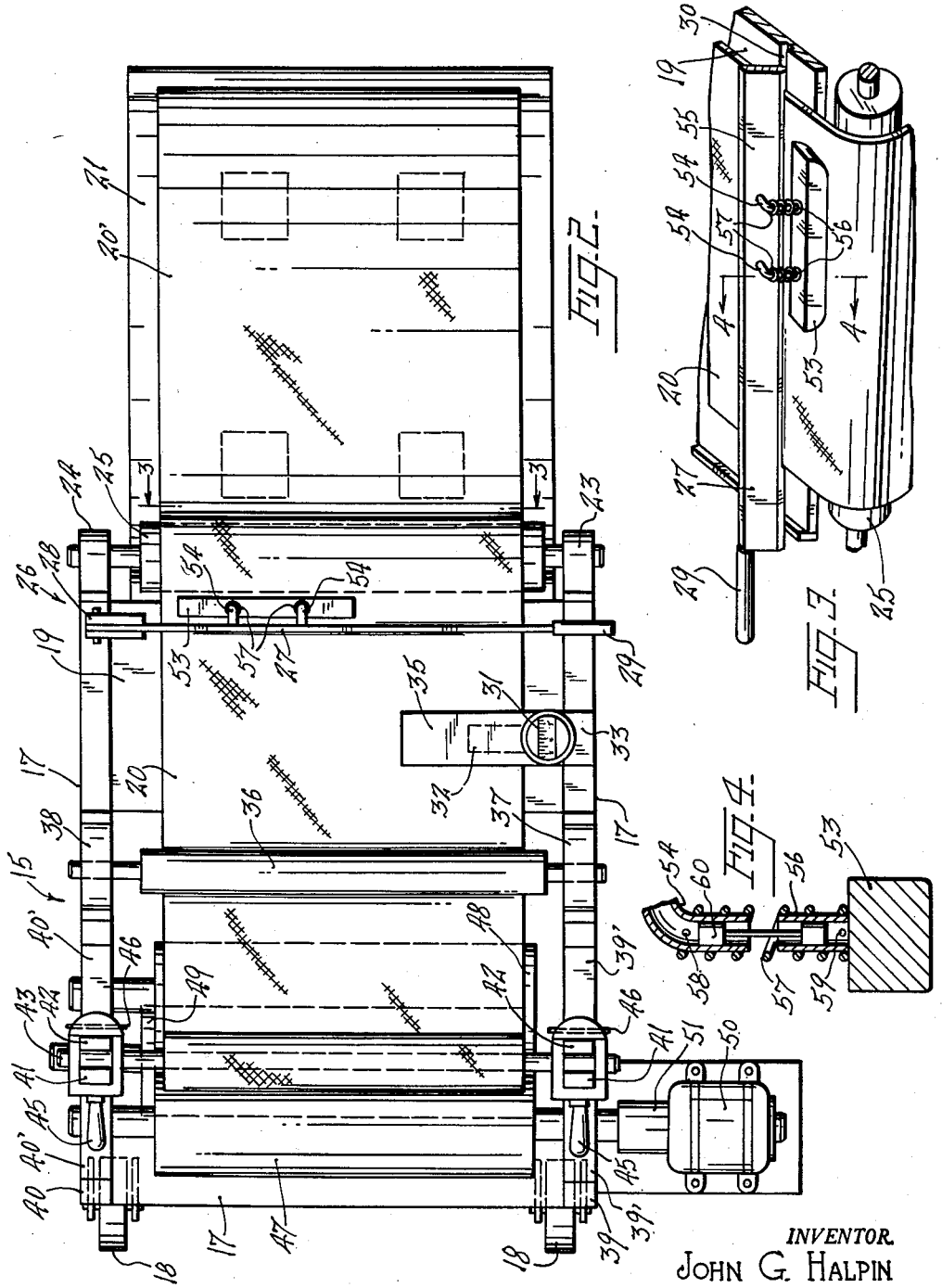

May 13, 1958  J. G. HALPIN  2,834,558
PORTABLE RE-ROLL, INSPECTION, MEASURING AND CUTTING UNIT FOR RUGS
Filed April 21, 1955  3 Sheets-Sheet 3
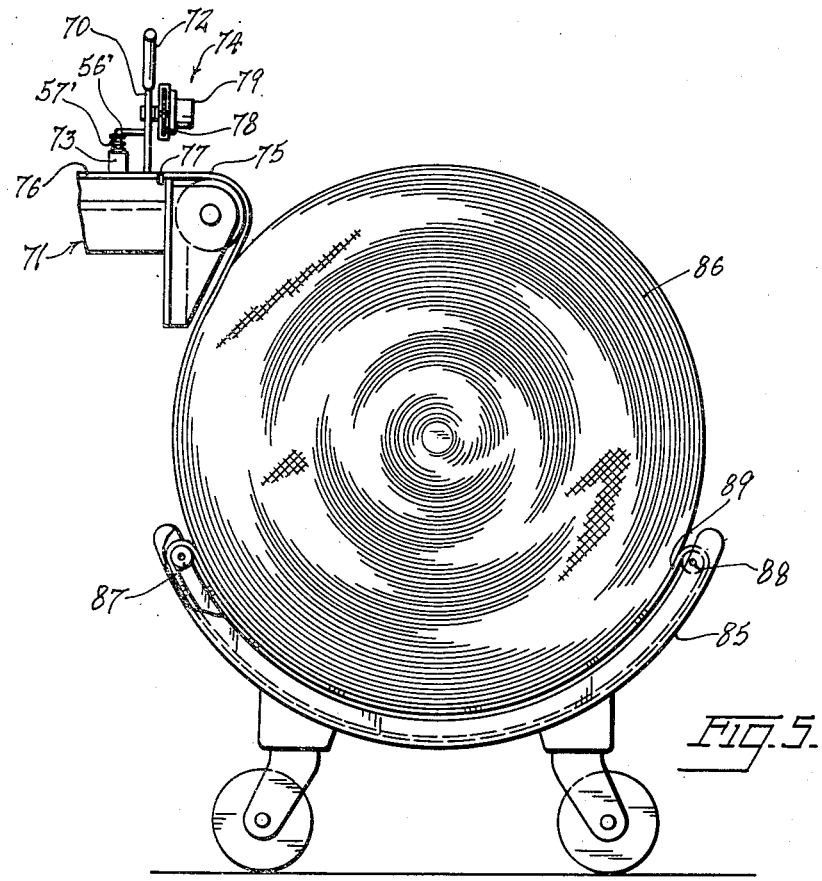
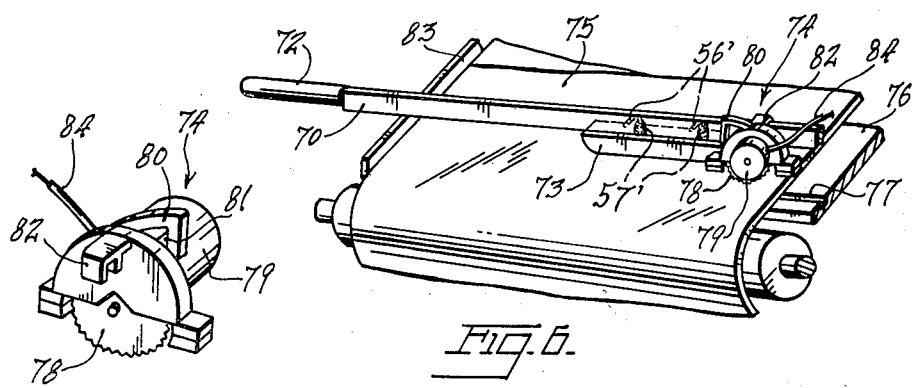
INVENTOR.
JOHN G. HALPIN
BY
*Zoltan Holacheky*
ATTORNEY

United States Patent Office 2,834,558
Patented May 13, 1958

2,834,558

PORTABLE RE-ROLL, INSPECTION, MEASURING, AND CUTTING UNIT FOR RUGS

John G. Halpin, Babylon, N. Y.

Application April 21, 1955, Serial No. 502,876

3 Claims. (Cl. 242—56)

This invention relates to new and useful improvements in inspection, measuring and cutting devices for carpets, rugs and like heavy materials.

More particularly, the present invention proposes the construction of an improved portable re-roll inspection, measuring and cutting device which can be used easily and conveniently to unroll and to re-roll large rolls of carpeting, rugs and like heavy materials in such a manner that the material can be inspected at any and all points throughout its length.

Still further, the present invention proposes constructing the device with a measuring meter roller member along the inspection table to measure the length of the material re-rolled and to measure out any shorter length for cutting of the larger roll of material to be unrolled.

As a further object, the present invention proposes constructing the device with a guide roller or rollers and with a cutting member adjacent the measuring meter member so that re-rolls of any length desired can be cut to length.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure:

Fig. 1 is a side elevational view of a cradle with a roll of heavy material therein and an inspection, measuring and cutting device constructed and arranged in accordance with the present invention with a re-roll spindle therein and with the motor removed.

Fig. 2 is a top plan view of the structure shown in Fig. 1 but with the gear head motor added.

Fig. 3 is a perspective fragmentary view taken along line 3—3 of Fig. 2.

Fig. 4 is a fragmentary sectional view taken on line 4—4 of Fig. 3.

Fig. 5 is a view similar to Fig. 1 but illustrating a modification of the present invention.

Fig. 6 is a view similar to Fig. 3 but showing the structure illustrated in Fig. 5.

Fig. 7 is a perspective view of the cutting device shown in Figs. 5 and 6.

The portable re-roll, inspection, measuring and cutting device of the present invention has a frame 15 of structural steel or the like having upright posts 16 and horizontal members 17, 17' and 17". Swivel casters 18 are rotatably and swivelly mounted on the upright posts 16 of the frame. In addition, frame 15 has a flat horizontally disposed table 19 at the top thereof wider than the width of any carpeting, rug or other heavy material 20 to be passed across it.

A portable arcuate cradle 21 mounted on swivel casters 22 and adapted to hold large rolls of carpeting, rugs and like heavy material 20 is provided for disposal at the front end of the table 19.

Mounted on the front end of the table and of the frame at each side thereof are spaced pillow blocks 23 and 24 between which is rotatably mounted a guide roller 25 to guide material 20 from the cradle 21 to the table 19.

Also mounted at the front end of the table 19 adjacent to and spaced back therefrom is a cutting member 26 having a knife 27 pivotally connected at one end to a base member 28 mounted on the frame at one side of the table. Knife 27 has a handle 29 for operating it in the manner of a paper cutter or guillotine. Table 19 is provided with a slot 30 for the knife 27 so that material 20 on the table 19 can be cleanly sheared.

Frame 15 also has mounted on it at one side of the table a measuring meter 31 connected with a measuring roller 32 rotatably mounted in bearing 33 at one side of the table. An upper meter guide 35 spaced from the measuring roller 32 holds the material 20 down against the measuring roller 32.

Spaced behind the measuring roller 32 on the frame is a guide roller 36 which is rotatably mounted between bearing members 37 and 38 mounted on the frame at each side thereof so that material 20 may pass from the measuring roller 32 and the table 19 beneath this guide roller 36.

Behind the guide roller 36 on the frame 15 two spaced side bearing plates 39 and 40 are fixed in opposed relation at each side of the frame. Spaced spindle holding brackets 39' and 40' are secured to the tops of the plates 39 and 40, respectively.

Spindle holding brackets 39' and 40' each has a pair of vertical arms 41 and 42 spaced apart a distance rotatably and slidably to hold a re-roll spindle or mandrel 43 therebetween for material 20 to be re-rolled thereon. Arm 41 on each bracket is pivotably connected piano hinge fashion at its lower end by a pivot pin 44 so that it can swing outwardly from the other arm 42 for inserting and removing re-roll spindles 43.

A bifurcated locking lever 45 is secured to each fixed arm 42 at the upper end thereof by a pivot pin 46 and holds the arm 41 in upright position and keeps it from pivoting.

A pair of spaced abrasive coated rollers 47 and 48 are rotatably held by the spaced side bearing plates 39 and 40 and a connecting roller 49 is rotatably mounted on the frame beneath and between the rollers 47 and 48. These three rollers 47, 48 and 49 are the spindle winding members which serve to roll material 20 onto the re-roll spindle 43. Connecting roller 49 is disposed in vertical alignment with the space between the arms 41 and 42 of the spindle holding brackets 39' and 40' so as to be in vertical alignment with a re-roll spindle 43 in the brackets. Abrasive coated rollers 47 and 48 are spaced apart but are both in peripheral contact with the connecting roller 49 so that rotary movement of any one of the three rollers 47, 48 or 49 will rotate the other two and in turn roll material 20 onto a re-roll spindle 43 slidably and rotatably held in the spindle holding brackets 39' and 40'.

Drive means for the spindle winding members may be of any conventional type such as gears, belts, pulleys, chains and motor but preferably in a direct drive as shown with a gear head motor 50 directly connected to one end of roller 47, the gear reduction head 51 of the motor serving to provide the necessary reduction in speed for the motor to rotate the spindle winding members slowly enough for visual inspection of the material 20 as it is drawn across the table and wound on the re-roll spindle.

Motor 50 has a conventional switch (not shown) for starting and stopping so that the material 20 can be stopped at any point for closer inspection or for cutting. Clutches or other well-known motor disconnecting means can be used if desired for long continuous use involving numerous cutting operations or the like.

A material holding shoe 53 is mounted on the knife 27 of cutting member 26 to hold material 20 after it is cut so that the severed end on the side of the knife facing the end of the table 19 will not fall from the table. Spaced tubular elbows 54 are fixed to the front side 55 of the knife 27 and like spaced tubular shanks 56 are fixed to the top of the shoe 53. Coil springs 57 encircle the elbows 54 and shanks 56 and the ends 58 and 59 of each coil spring 57 are secured to one of the elbows 54 and one of the shanks 56, respectively. Internal guide rods 60 slidably mounted in and between the tubular elbows and the tubular shanks keep the elbows and shanks aligned.

The cradle 21 is provided with a plurality of rollers 61 to make it easy to revolve a roll of material therein.

To use the new device, a roll of carpeting, rugs or heavy material 20 is placed in the cradle and rolled up to the front end of the table. The outer end of the large roll 20' of material 20 is threaded through the device over the end guide roller, under the knife, over the measuring roller and through the measuring meter, under the guide roller and onto the re-roll spindle 43, the re-roll spindle 43 being placed in the brackets 39 and 40 and free to rotate therein and to slide vertically therein as the material 20 is rolled onto the re-roll spindle by the abrasive coated rollers 47 and 48. The measuring roller and meter measures material 20 as it passes through and the table permits inspection of all parts of the surface of material 20 as it passes thereover. The operator may thus stop the motor 50 or disconnect it at any point desired and cut the material 20 at that point so that rolls of any length may be obtained on a re-roll spindle.

Once cut, the severed end will not fall from the front end of the table but shoe 53 connected to the knife will hold this end until the operator can complete the re-rolling operation and put another re-roll spindle in place after which time the operator can then lift the knife and the shoe with one hand while holding the free end of the material with the other and. Once the knife has been moved to its normal self-sustaining raised position, both of the operator's hands will be free to re-thread the device.

The modification of the invention illustrated in Figs. 5, 6 and 7 is characterized by the provision of a guide bar 70 pivotally secured at one end to frame 71. Guide bar 70 has a handle 72 at one end and a material holding shoe 73 is mounted on the guide bar. The shoe 73 is constructed similar to shoe 53 shown in Figs. 1 to 4, inclusive, and described above and like parts on the two shoes are given like reference numerals but those on shoe 73 primed to distinguish the figures.

A motorized rotary cutting device 74 is provided to cut material 75 on table 76. The table 76 is provided with a slot 77 for the saw or rotary blade 78 to travel in and cleanly cut the material. The cutter 74 has an electric motor 79 connected with the blade 78 and a handle 80 with a trigger 81 to start and stop the motor 79 and blade 78. A bracket 82 on the cutter 74 permits the cutter to be drawn back and forth along the guide bar 70. An upstanding flange 83 on the table 76 at one side of it guides the material along the table and permits it properly to enter a metering device such as the one shown in Fig. 1.

Motor 79 is connected by cord 84 with a source of electric current and the cord may be held on a spring reel (not shown) of any well known type.

In addition, a cradle 85 for holding roll 86 of material 75 is provided with belt carrying spaced rollers 87 and 88 at each side rotatably mounted on the cradle. An endless belt 89 extends between the rollers 87 and 88 to hold the roll 86 of material 75.

While I have illustrated and described the preferred embodiments of my invention, it is to be understood that I do not limit myself to the precise constructions herein disclosed and that various changes and modifications may be made within the scope of the invention as defined in the appended claims.

Having thus described my invention, what I claim as new, and desire to secure by United States Letters Patent is:

1. A portable re-roll inspection, measuring and cutting device for carpets, rugs and like heavy materials comprising a frame with casters, said frame having a table adapted for moving carpeting, rugs and other like heavy material thereacross, a cutting member mounted on the frame and disposed over the table, a measuring roller rotatably mounted on the table adjacent the cutting member, spaced spindle holding brackets on the frame adjacent the table adapted to hold a re-roll spindle therebetween, spindle winding members rotatably mounted on the frame adjacent the spindle holding brackets, means to rotate the spindle winding members, said spaced spindle holding brackets each having a pair of vertical arms spaced apart a distance rotatably and slidably to hold a re-roll spindle therebetween, one of said arms of each bracket being pivotally connected to swing outwardly from the other arm for inserting and removing re-roll spindles, and a bifurcated locking lever on the other of said arms for each pair of arms to prevent the pivotable arm from pivoting.

2. A portable re-roll inspection, measuring and cutting device for carpets, rugs and like heavy materials comprising a frame with casters, said frame having a table adapted for moving carpeting, rugs and other like heavy material thereacross, a cutting member mounted on the frame and disposed over the table, a measuring roller rotatably mounted on the table adjacent the cutting member, spaced spindle holding brackets on the frame adjacent the table adapted to hold a re-roll spindle therebetween, spindle winding members rotatably mounted on the frame adjacent the spindle holding brackets, means to rotate the spindle winding members, said spaced spindle holding brackets each having a pair of vertical arms spaced apart a distance rotatably and slidably to hold a re-roll spindle therebetween, one of said arms of each bracket being pivotally connected to swing outwardly from the other arm for inserting and removing re-roll spindles, and a bifurcated locking lever on the other of said arms for each pair of arms to prevent the pivotable arm from pivoting, said spindle winding members being a pair of abrasive coated rollers and a connecting roller in peripheral contact therewith, said connecting roller being disposed for vertical alignment with a re-roll spindle held between said brackets.

3. A portable re-roll inspection, measuring and cutting device for carpets, rugs and like heavy materials comprising a frame with casters, said frame having a table adapted for moving carpeting, rugs and other like heavy material thereacross, a cutting member mounted on the frame and disposed over the table, a measuring roller rotatably mounted on the table adjacent the cutting member, spaced spindle holding brackets on the frame adjacent the table adapted to hold a re-roll spindle therebewteen, spindle winding members rotatably mounted on the frame adjacent the spindle holding brackets, means to rotate the spindle winding members, and means connected with the cutting member to hold material severed by said cutting member on the table, said means being a shoe resiliently mounted on the side of the cutting member, facing the end of the table, said shoe including spaced tubular elbows fixed to the front side of the cutting member, spaced tubular shanks fixed on the top of the shoe for insertion in said elbows, coil springs encircling the elbows and shanks with one end secured to the elbows and the other end to the shanks, and guide rods slidable in and between the elbows and shanks for keeping the elbows and shanks in alignment.

References Cited in the file of this patent

UNITED STATES PATENTS

| 492,964 | Meisel | Mar. 7, 1893 |
| 2,156,820 | Salyers | May 2, 1939 |
| 2,525,509 | Pugh | Oct. 10, 1950 |
| 2,619,298 | Aulen | Nov. 25, 1952 |
| 2,621,736 | Scruggs et al. | Dec. 16, 1952 |